(12) United States Patent
Xu et al.

(10) Patent No.: US 10,609,603 B2
(45) Date of Patent: *Mar. 31, 2020

(54) METHOD FOR SUPPORTING INDICATION OF A FAILURE EVENT TO A SOURCE ACCESS SYSTEM

(71) Applicant: Samsung Electronics Co., Ltd., Suwon-si, Gyeonggi-do (KR)

(72) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,679

(22) Filed: Feb. 25, 2019

(65) Prior Publication Data

US 2019/0191340 A1     Jun. 20, 2019

Related U.S. Application Data

(63) Continuation of application No. 15/657,857, filed on Jul. 24, 2017, now Pat. No. 10,219,185, which is a
(Continued)

(30) Foreign Application Priority Data

Sep. 21, 2012   (CN) .......................... 2012 1 0359119

(51) Int. Cl.
*H04W 36/00* (2009.01)
*H04W 24/02* (2009.01)
*H04W 36/14* (2009.01)

(52) U.S. Cl.
CPC ... *H04W 36/0016* (2013.01); *H04W 36/0061* (2013.01); *H04W 36/0066* (2013.01); *H04W 24/02* (2013.01); *H04W 36/14* (2013.01)

(58) Field of Classification Search
CPC ......... H04W 36/0016; H04W 36/0061; H04W 36/0066; H04W 36/14; H04W 24/02
(Continued)

(56) References Cited

U.S. PATENT DOCUMENTS 8,594,047 B2   11/2013   Gao et al.
8,792,895 B2    7/2014   Huang
(Continued)

FOREIGN PATENT DOCUMENTS

CN    102238656 A    11/2011
CN    102378290 A     3/2012
(Continued)

OTHER PUBLICATIONS

CATT, "Discussion on inter-RAT MRO solutions", R3-120114, XP050566607, Jan. 31, 2012.
(Continued)

*Primary Examiner* — Hirdepal Singh
(74) *Attorney, Agent, or Firm* — Jefferson IP Law, LLP

(57) ABSTRACT

A method for supporting indication of a failure event to a source access system is provided. The method includes notifying, by the source access system, information of a source cell to a target access system, routing, by the target access system, a message to the base station or the base station controller of the source access through a core network by use of the information of the source cell received from the source access system when the target access system needs to transmit a message to the source access system. By use of the method provided by the present disclosure, a problem of mobility robustness optimization (MRO) among different radio access technology (RAT) may be notified to the source access system, so as to avoid impact for a terminal, reduce operator configuration.

20 Claims, 7 Drawing Sheets

Related U.S. Application Data continuation of application No. 14/430,311, filed as application No. PCT/KR2013/008390 on Sep. 17, 2013, now Pat. No. 9,730,115.

(58) Field of Classification Search
USPC .......................................................... 455/436
See application file for complete search history.

(56) References Cited

U.S. PATENT DOCUMENTS

| | | | |
|---|---|---|---|
| 9,107,133 B2* | 8/2015 | Catovic | H04W 24/02 |
| 9,736,744 B2 | 8/2017 | Park et al. | |
| 2008/0025263 A1 | 1/2008 | Pelkonen | |
| 2011/0250925 A1 | 10/2011 | Han | |
| 2011/0269465 A1* | 11/2011 | Xu | H04W 36/0033 |
| | | | 455/436 |
| 2012/0069732 A1 | 3/2012 | Xu et al. | |
| 2012/0202557 A1 | 8/2012 | Olofsson et al. | |
| 2013/0045749 A1* | 2/2013 | Sridhar | H04W 36/0085 |
| | | | 455/443 |
| 2013/0102270 A1 | 4/2013 | Suh et al. | |
| 2013/0294410 A1 | 11/2013 | Shuai et al. | |
| 2013/0331105 A1 | 12/2013 | Olofsson et al. | |
| 2014/0057634 A1 | 2/2014 | Chang et al. | |
| 2014/0155065 A1 | 6/2014 | Centonza et al. | |
| 2014/0160938 A1 | 6/2014 | Qu | |
| 2014/0274060 A1 | 9/2014 | Fujishiro | |
| 2014/0274070 A1 | 9/2014 | Lim et al. | |
| 2014/0287757 A1* | 9/2014 | Borg | H04W 8/26 |
| | | | 455/436 |
| 2014/0378136 A1 | 12/2014 | Park et al. | |
| 2015/0043386 A1* | 2/2015 | Racz | H04L 41/044 |
| | | | 370/255 |
| 2015/0065136 A1 | 3/2015 | Lee et al. | |
| 2015/0139195 A1 | 5/2015 | Xiao et al. | |
| 2015/0172982 A1* | 6/2015 | Park | H04W 36/14 |
| | | | 370/332 |
| 2015/0195762 A1* | 7/2015 | Watanabe | H04W 36/0083 |
| | | | 455/436 |
| 2017/0325147 A1* | 11/2017 | Yang | H04W 36/30 |
| 2018/0035339 A1* | 2/2018 | Mitsui | H04W 36/08 |

FOREIGN PATENT DOCUMENTS

| | | |
|---|---|---|
| CN | 102630389 A | 8/2012 |
| KR | 10-2011-0138548 A | 12/2011 |
| WO | 2010/092457 A1 | 8/2010 |
| WO | 2011/090290 A2 | 7/2011 |
| WO | 2011-131221 A1 | 10/2011 |
| WO | 2012-019363 A1 | 2/2012 |

OTHER PUBLICATIONS

NEC: "way forward for Inter-RAT MRO", XP050425330, May 1, 2010.
Huawei, "Inter RAT handover procedures between 3GPP access systems", XP050258891, Jan. 9, 2007.
"Inter-RAT MRO leftover issues", XP050670086, Sep. 29, 2012.
3GPP, TS 36.300 v11.2.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) Jun. 2012.
R2-122140, Analysis of UE impacts per IRAT MRO solution [online], 3GPP TSG-RAN WG2 # 78, May 21-25, 2012.
Chinese Examination Report dated Jan. 4, 2018 issued in Chinese Application 201210359119.9.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10), 3GPP TS 36.300 V10.8.0, Jun. 26, 2012, Valbonne—France.
Indian Office Action dated Nov. 29, 2019, issued in Indian Application No. 1007/KOLNP/2015.
Korean Office Action dated Dec. 19, 2019, issued in Korean Application No. 10-2015-7010282.

* cited by examiner

METHOD FOR SUPPORTING INDICATION OF A FAILURE EVENT TO A SOURCE ACCESS SYSTEM

CROSS-REFERENCE TO RELATED APPLICATION(S)

This application is a continuation application of prior application Ser. No. 15/657,857, filed on Jul. 24, 2017, which is a continuation application of prior application Ser. No. 14/430,311, filed on Mar. 23, 2015, which issued as U.S. Pat. No. 9,730,115 on Aug. 8, 2017, which is a U.S. National Stage application under 35 U.S.C. § 371 of an International application filed on Sep. 17, 2013 and assigned application number PCT/KR2013/008390, which is based on and claimed priority of a Chinese patent application filed on Sep. 21, 2012 in the State Intellectual Property Office and assigned Serial number 201210359119.9, the entire disclosure of each of which is hereby incorporated by reference.

TECHNICAL FIELD

The present disclosure relates to mobile communication system field. More particularly, the present disclosure relates to a method for supporting indication of a failure event to a source access system.

BACKGROUND

With the development of communication technology, a mobile communication system has developed to a system of system architecture evolution (SAE).

FIG. 1 is a schematic diagram illustrating a structure of an SAE system according to the related art.

Referring to FIG. 1, the SAE system includes an evolved universal terrestrial radio access network (E-UTRAN) 101 and at least includes a mobility management entity (MME) 105 and a core network of a user plane entity (i.e., a serving-gateway (S-GW)) 106. The E-UTRAN 101 is used to connect a user equipment (UE) to the core network. Moreover, the E-UTRAN 101 also includes more than one macro base stations (i.e., an evolved node B (eNB)) 102 and home base stations (i.e., a home eNB (HeNB)) 103, optionally includes a home base station gateway (HeNB GW) 104, the MME 105 and S-GW 106, which may be integrated into one module for implementation, or may be separated to be implemented individually. Herein, inter-connection between eNBs 102 is through an X2 interface. The eNB 102 is connected respectively to MME 105 and S-GW 106 through an S1 interface. Alternatively, the eNB 102 is connected to the optional HeNB GW 104 through the S1 interface, the HeNB GW 104 is connected respectively to the MME 105 and the S-GW 106 through the S1 interface.

In an early state of establishing the SAE system or during a process of operating the SAE system, much manpower and material resources are taken to configure and optimize parameters of the SAE system, especially to configure wireless parameters, so as to ensure good coverage and capacity of the SAE system, mobility robustness, load balancing when moving and speed of accessing user device, and the like. In order to save the manpower and material resources for configuration during SAE system operation, a method for self-optimizing the SAE system is currently proposed. During a self-optimization operation, eNB configuration or HeNB configuration is optimized actually according to a current state of the SAE system. The eNB and HeNB are referred as to eNB hereinafter to instruct the method for self-optimizing the SAE system.

FIG. 2 is schematic diagram illustrating a basic principle of self-optimizing an SAE system according to the related art.

Referring to FIG. 2, after the eNB powers up or accesses SAE, the self-optimization configuration may be performed. The operation includes eNB basic configuration and initial wireless parameter configuration. Herein the eNB basic configuration includes configuration of an internet protocol (IP) protocol address of the eNB, operation administration and maintenance (OA & M), authentication between the eNB and the core network. When the eNB is the HeNB, it is needed to detect the HeNB GW to which the HeNB belongs. Software and operation parameters of the eNB are downloaded to perform self-configuration. Initial wireless parameter configuration is implemented according to experience or simulation. Performance of each eNB in the SAE system may be impacted by environment of region where the eNB locates. Thus, the eNB needs to perform initial configuration of a list of neighbor cells and initial configuration of the load balancing specifically according to initial wireless parameter configuration of the environment of the region where the eNB locates. After the self-configuration operation is completed, many parameters configured for the eNB are not optimized.

In order to make the performance of the SAE system better, configuration of the eNB is needed to be optimized or adjusted, which is also called self-optimization of the mobile communication system. When the configuration of the eNB is to be optimized or adjust, the eNB may be controlled by the OA &M in a background to execute it. A standard interface may exist between the OA & M and the eNB. The OA & M transmits the parameters to be optimized to the eNB (which may be the eNB or the HeNB) through the interface.

Thereafter, the eNB optimizes the parameters configured to the eNB itself according to the parameters to be optimized. The operation may be executed by the eNB itself. For example, the eNB performs detection to obtain the performance to be optimized, performs optimization and adjustment to corresponding parameters of the eNB itself. Optimization or adjustment of eNB configuration may include self-optimization of the list of neighbor cells, self-optimization of the coverage and the capacity, self-optimization of mobility robustness, self-optimization of the load balancing, self-optimization of parameters of a random access channel (RACH), and the like.

Hereinafter, a basic principle of the self-optimization of the mobile robustness in Release 10 is described. When a radio link failure (RLF) or a handover failure occurs for the UE and the UE returns to a connection mode, the UE indicates that the UE has an available RLF report to the network. The network transmits a message to the UE to request the RLF report. The RLF report transmitted by the UE includes information of an e-UTRAN cell global identifier (ECGI) of a cell serving the UE lastly, an ECGI of a cell to which re-establishment is tried, an ECGI of a cell where a handover operation is, triggered lastly, time from handover triggered lastly to a connection failure, whether a reason of the connection failure is a RLF or handover failure, radio measurement. A base station obtaining the RLF report of the UE forwards the RLF report obtained from the UE to a base station of the cell serving the UE lastly. The base station of the cell serving the UE lastly determines whether the reason is too early handover, too late handover, handover to an error cell or a coverage hole. If the reason is the too early handover or the handover to an error cell, the base station transmits information of the too early handover or the handover to an error cell to the base station which triggers the too early handover or the base station where the UE is handed over to an error cell.

Therefore, a need exists for a method for supporting indication of a failure event to a source access system to avoid impact for a UE, reduce operator configuration, transmit a handover report to the source access system correctly, and improve performance of a mobile communication system.

The above information is presented as background information only to assist with an understanding of the present disclosure. No determination has been made, and no assertion is made, as to whether any of the above might be applicable as prior art with regard to the present disclosure.

SUMMARY

For Mobility Robustness Optimization (MRO) between different radio access technology (RAT), e.g., too early handover from the $3^{rd}$ Generation (3G) or $2^{nd}$ Generation (2G) to long term evolution (LTE), a radio link failure (RLF) occurs for the user equipment (UE) in evolved Node B1 (eNB1) when the radio network controller (RNC) just hands over the UE to eNB1 successfully. When accessing LTE next time, the UE transmits an RLF report to an accessed eNB (e.g., eNB2). The eNB2 transmits a RLF indication message to eNB1. The eNB1 determines the reason of the failure. If the reason is too early inter-RAT handover, the eNB1 transmits a handover report to the RNC. The eNB1 needs to transmit a handover report to a source RNC through the core network. Through the RLF indication message, the eNB1 may know a cell identifier of a source cell. But the eNB1 does not know other location information of the source cell, so that the eNB1 cannot route the handover report to the source RNC.

Aspects of the present disclosure are to address at least the above-mentioned problems and/or disadvantages and to provide at least the advantages described below. Accordingly, an aspect of the present disclosure is to provide a method for supporting indication of a failure event to a source access system to avoid impact for a UE, reduce operator configuration, transmit a handover report to the source access system correctly, and improve performance of a mobile communication system.

In accordance with an aspect of the present disclosure, a method for supporting indication of a failure event to a source access system is provided. The method includes notifying, by the source access system, information of a source cell to a target access system, and transmitting, by the target access system, a message to the source access system when the target access system needs to transmit the message to the base station to which the source cell belongs. The received information of the source cell is used to routing the message to the source access system.

It should be noted that the source access system notifies the information of the source cell to the target access system through handover preparation.

It should be noted that the information of the source cell comprises one or more of the following information: a cell identifier of the source cell, a location area identity (LAI) to which the source cell belongs, a routing area code (RAC) to which the source cell belongs, an identifier of the RNC to which the source cell belongs, an extended identifier of the RNC to which the source cell belongs, and a tracking area identity (TAI) to which the source cell belongs.

It should be noted that the message includes the cell identifier of the source cell, and/or the LAI and the RAC to which the source cell belongs, and/or the identifier of the RNC to which the source cell belongs, and/or the extended identifier of the RNC to which the source cell belongs, and/or the TAI to which the source cell belongs when the target access system transmits the message to the base station to which the source cell belongs.

It should be noted that a node of a target core network finds a node of a source core network according to the LAI and RAC or TAI to which the source cell belongs.

It should be noted that when the source access system is 3G, the source serving GPRS support node (SGSN) finds a source base station (i.e., a source RNC) according to the identifier of the RNC to which the source cell belongs or the extended identifier of the RNC. If the source access system is LTE, the source mobility management entity (MME) finds a source eNB according to the cell identifier of the source cell.

In embodiments of the present disclosure, in a method for supporting indication of a failure event to a source access system, the source access notifies information of the source cell to the target access system. When needing to transmit the message to the source access system, the target access system routes the needed message to the base station or a base station controller of the source access system through the core network by use of the information of the source cell received from the source access system. The target access system notifies a problem of MRO between different RATs to the source access system, so as to avoid impact for a UE, reduce operator configuration. Thus, the problem of the MRO between different RATs is addressed, and the performance of the mobile communication system is improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In order to address issues of the related art, the present disclosure provides a method for supporting indication of a failure event to a source access system, i.e., notifying, by the source access system, information of a source cell to a target access system, transmitting, by the target access system, a message to the source access system when the target access system needs to transmit the message to the base station to which the source cell belongs.

By applying the method provided by the present disclosure, a problem of mobility robustness optimization (MRO) among different radio access technology (RAT) may be notified to source access systems, impact for a terminal is avoided, operator configuration is reduced. Thus, the issue of the MRO among different RATs are addressed, system performance is improved.

In order to clarify the technical scheme and advantages of the present disclosure, the present disclosure is described further hereinafter with reference to accompanying drawings and examples.

Figure 1:
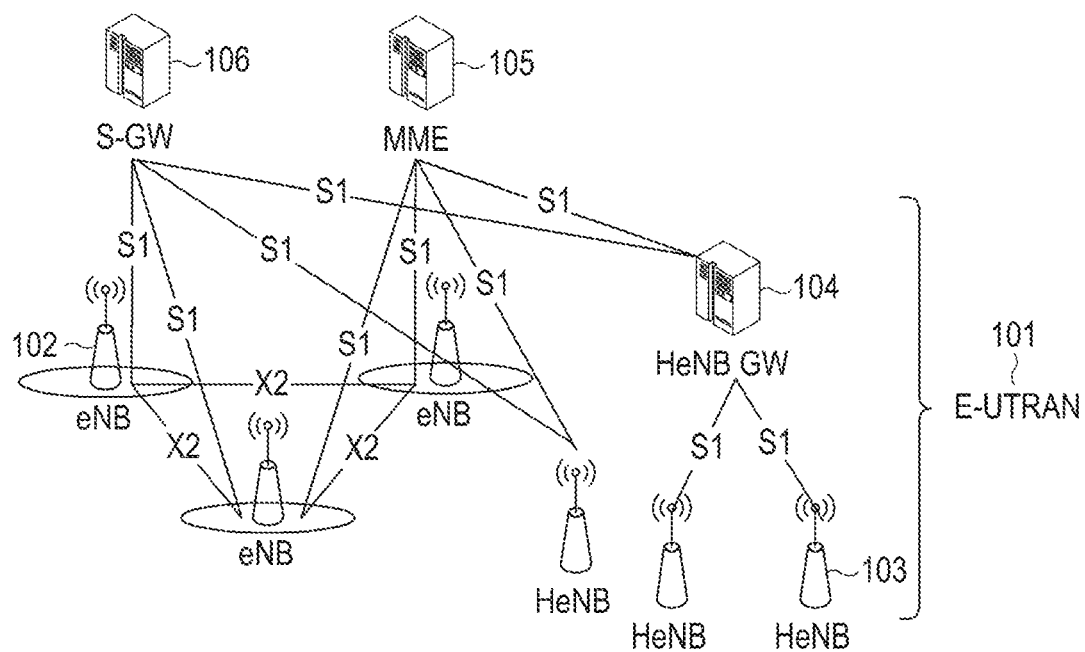
FIG. 1 is a schematic diagram illustrating a structure of a system architecture evolution (SAE) system according to the related art.
Figure 2:
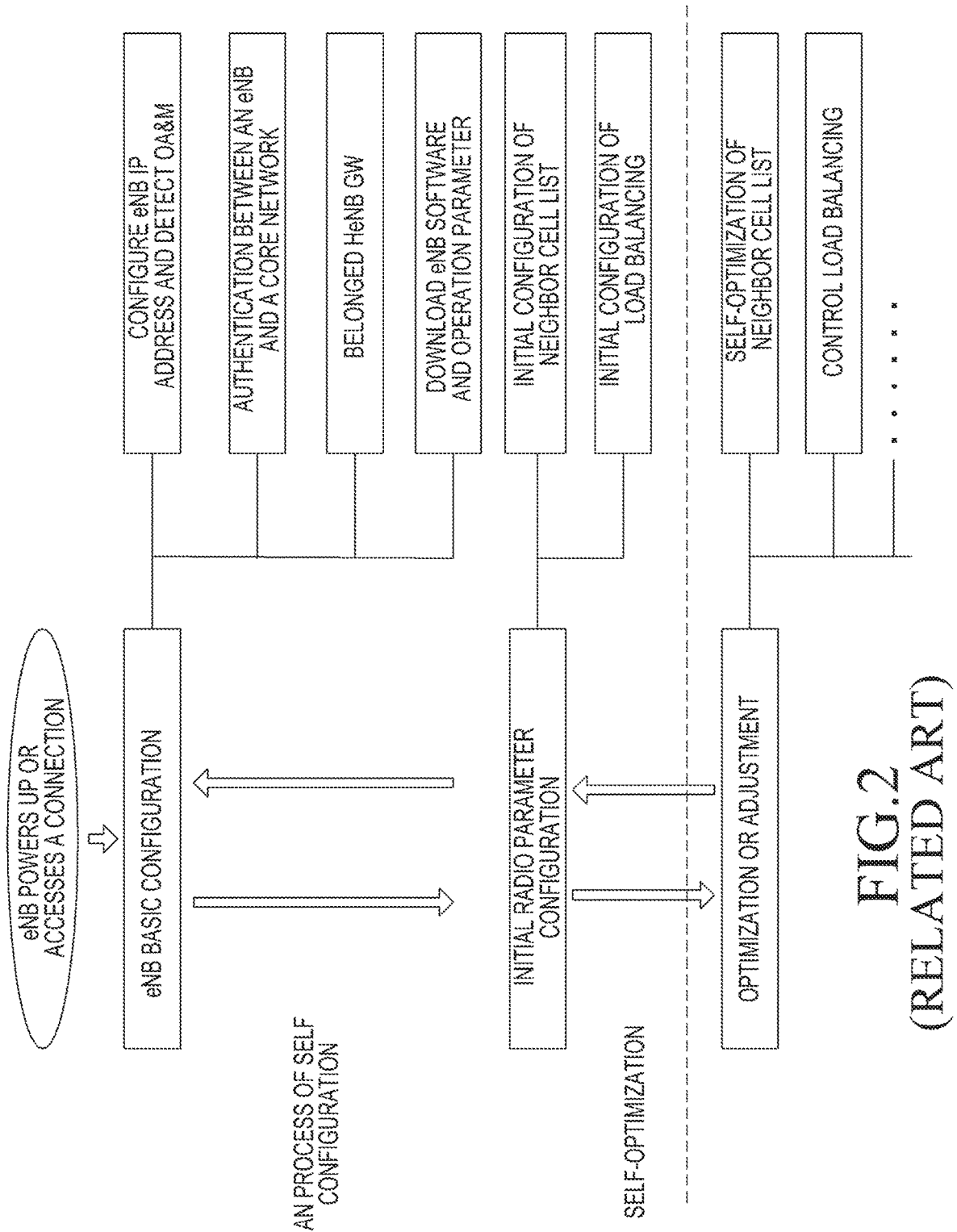
FIG. 2 is a schematic diagram illustrating a basic principle of self-optimizing an SAE system according to the related art.
Figure 3:
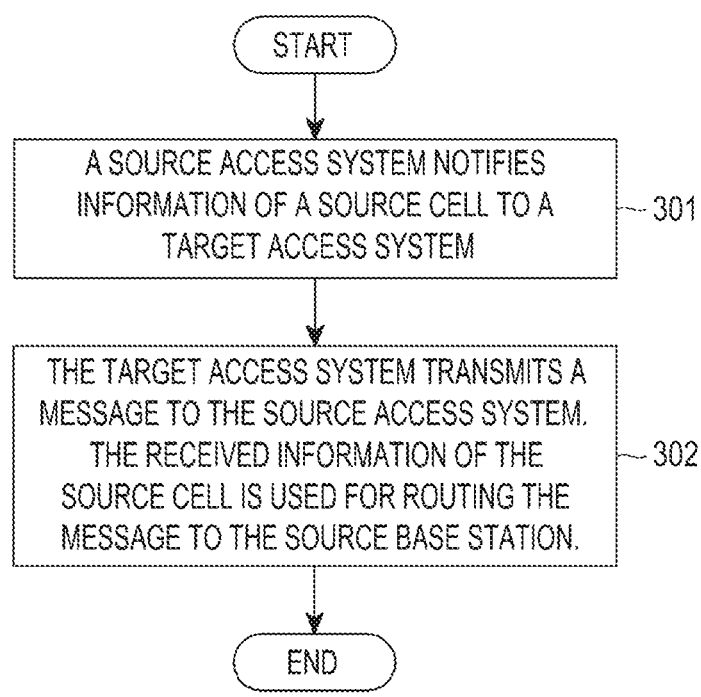
FIG. 3 is a flowchart illustrating a method for supporting indication of a failure event to a source access system according to an embodiment of the present disclosure.

FIG. 3 is a flowchart illustrating a method for supporting indication of a failure event to a source access system an embodiment of the present disclosure.

Referring to FIG. 3, the operation includes the process provided below.

In operation 301, the source access system notifies information of a source cell to a target access system. The information of the source cell includes one or more of the following information: a cell identifier of the source cell, a location area identity (LAI) to which the source cell belongs, a routing area code (RAC) to which the source cell belongs, an identifier of the radio network controller (RNC) to which the source cell belongs, an extended identifier of the RNC to which the source cell belongs, and a tracking area identity (TAI) to which the source cell belongs.

The source access system notifies the information above of a base station to which the source cell belongs to a target cell through a relocation required message, a handover required message, a forwarding relocation request message, a relocation request message or a handover request message. Alternatively, the source access system may transmit the information to the base station to which the target cell belongs through a transparent container in the messages from a source to a target.

In operation 302, when needing to transmit a message to the base station to which the source cell belongs, the target access system transmits the message to the source access system. The target access system knows the source base station information according to the received information of the source cell. The information of the source cell is used for routing the message from the target base station to the source base station.

Specifically, when the target access system detects that the source cell triggers unsuitable inter-RAT handover to the target cell, the target access system transmits a message to the base station to which the source cell belongs, notifies the unsuitable inter-RAT handover to the base station to which the source cell belongs, e.g., too early inter-RAT handover or handover to an wrong RAT. The message includes the cell identifier of the source cell, and/or the LAI to which the source cell belongs, and/or the RAC to which the source cell belongs, and/or the identifier of the RNC to which the source cell belongs, and/or the extended identifier of the RNC to which the source cell belongs, and/or the TAI to which the source cell belongs.

According to the LAI and RAC or TAI to which the source cell belongs, a node of a target core network (e.g., a mobility management entity (MME) or a serving GPRS support node (SGSN) or a mobile switching center (MSC)) finds a node of a source core network (e.g., an MME or a SGSN or an MSC). If the source access system is 3G, the node of the target core network finds a source SGSN according to the LAI and/or the RAC. If the source access system is LTE, the node of the target core network finds a source MME according to the TAI. If the source access system is 3G, the source SGSN finds a source base station (i.e., a source RNC) according to the identifier of the RNC to which the source cell belongs or the extended identifier of the RNC. If the source access system is LTE, the source MME finds a source evolved Node B (eNB) according to the cell identifier of the source cell.

Thereafter, the whole operation of the method for supporting indication of a failure event to a source access system provided by the present disclosure ends.

Figure 4:
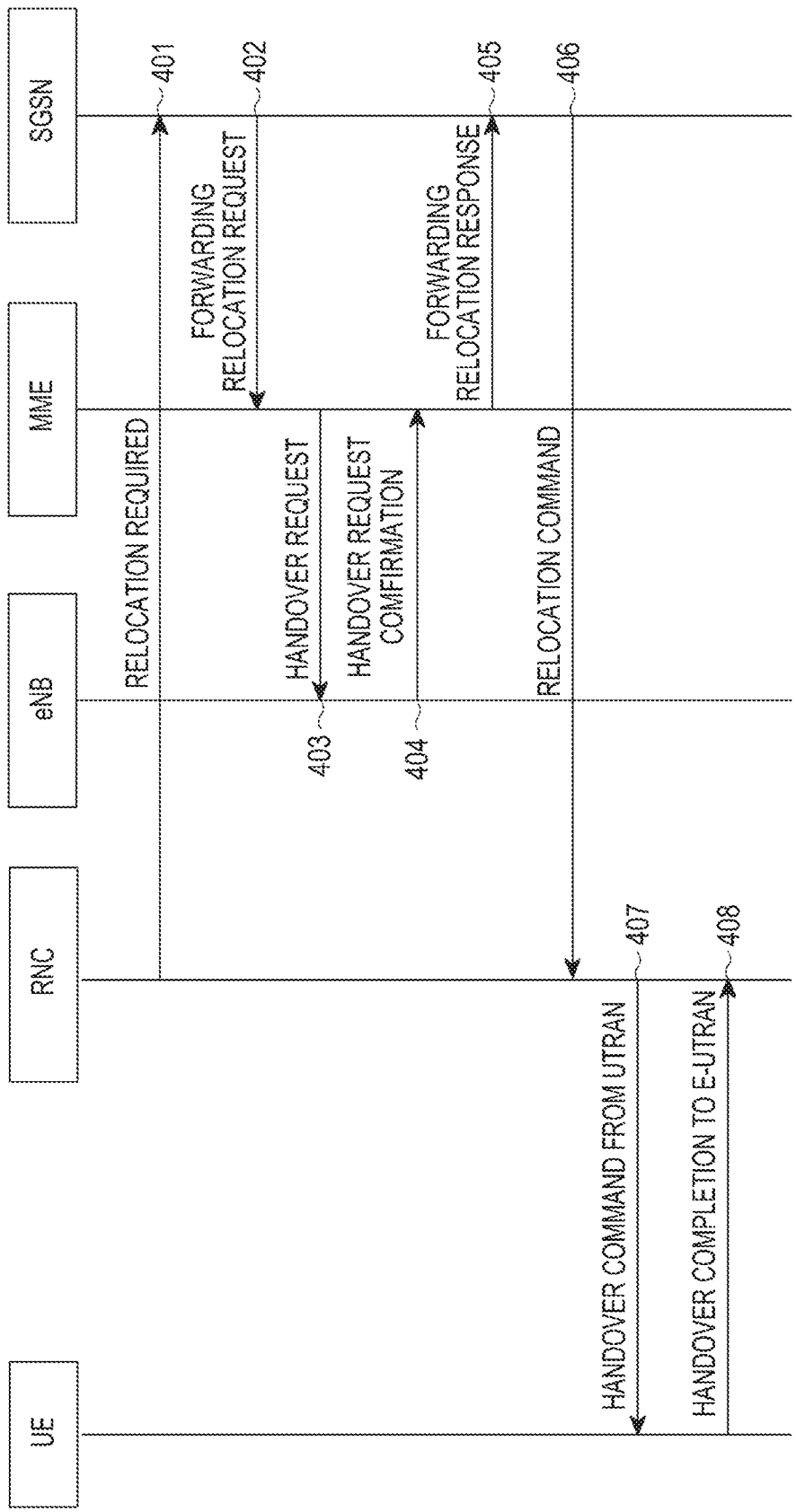
FIG. 4 is a schematic diagram illustrating a method for supporting indication of a failure event to a source access system according to a first embodiment of the present disclosure.

FIG. 4 is a schematic diagram illustrating a method for supporting indication of a failure event to a source access system according to a first embodiment of the present disclosure.

Referring to FIG. 4, the operation includes the process provided below.

In operation 401, an RNC determines handover. The RNC transmits a relocation required message to an SGSN. The message includes information of a source cell. The information of the source cell includes one or more kinds of the following information: a cell identifier of the source cell, a LAI to which the source cell belongs, a RAC to which the source cell belongs, an identifier of the RNC to which the source cell belongs, and an extended identifier of the RNC to which the source cell belongs.

In operation 402, the SGSN transmits a forwarding relocation request message to an MME. The message includes information of the source cell. The information of the source cell is same as that in operation 401, which is not described repeatedly herein.

In operation 403, the MME transmits a handover request message to an eNB. The message includes the information of the source cell. The information of the source cell is same as that in operation 401, which is not described repeatedly herein. The eNB saves the information of the source cell.

In operation 404, the eNB transmits a handover request confirmation message to the MME.

In operation 405, the MME transmits a forwarding relocation response message to the SGSN.

In operation 406, the SGSN transmits a relocation command message to the RNC.

In operation 407, the RNC transmit a handover command message from a UTRAN to the UE.

In operation 408, a UE transmit a completion of handover to an E-universal terrestrial radio access network (UTRAN) to the RNC.

Thereafter, the whole operation of the method for supporting indication of a failure event to a source access system in accordance with a first embodiment of the present disclosure ends.

Figure 5:
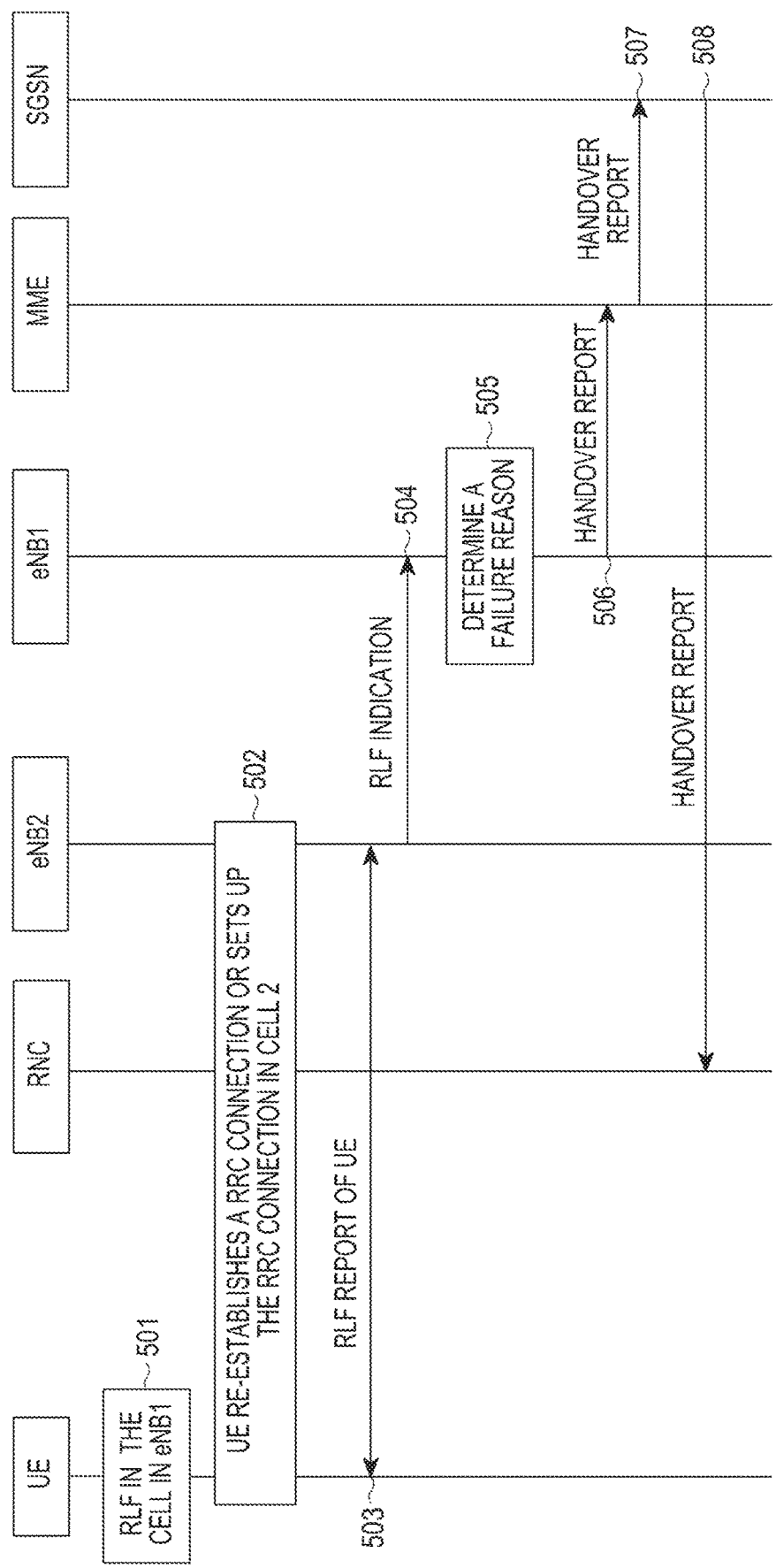
FIG. 5 is a schematic diagram illustrating a method for indicating a failure event to a source access system according to a first embodiment of the present disclosure.

FIG. 5 is a flowchart illustrating a method for indicating a failure event to a source access system according to a first embodiment of the present disclosure.

For example, the embodiment may be used in the following scenario: an RNC just hand over a UE to eNB1 successfully in the first embodiment. A radio link failure (RLF) occurs for the UE in the cell of the eNB1. When the UE re-accesses to a LTE cell, e.g., accessing cell2 (i.e., a cell controlled by eNB2) or is handed over the cell2, the UE transmits a saved RLF report to a base station to which the cell2 belongs. Herein, after RLF in cell1, the UE may access a 3G cell, e.g., cell3 first, and then returns to the cell2 of LTE or is handed to the cell2 of LTE.

Referring to FIG. 5, the operation includes the process provided below.

In operation 501, the RLF occurs in the cell of the eNB1 for the UE.

In operation 502, when the UE returns to a LTE cell, e.g., the UE establishes an RRC connection or executes an RRC connection re-establishment in the cell2 controlled by the eNB2 or is handed over to the cell2 of LTE, the UE indicates to the base station that the UE has information of the RLF report in an RRC connection setup request or an RRC connection setup completion or an RRC connection re-establishment request or an RRC connection re-establishment completion or a handover completion or an RRC connection re-configuration completion or other RRC messages transmitted by the UE.

In operation 503, the eNB2 requests the UE to report the information of the RLF report. The UE transmits the saved RLF report to the eNB2. The RLF report of the UE includes a cell identifier of a cell serving the UE lastly before a failure occurs. Content of the RLF report of the UE is not emphasis in the present disclosure, which is not described herein.

In operation 504, the eNB2 transmits a RLF indication message to a base station serving the UE lastly before the failure occurs. The RLF report of the UE includes the cell identifier of the cell serving the UE lastly before the failure occurs. The eNB2 transmits the RLF indication to the base station of the cell where the failure occurs according to the cell identifier. The RLF indication message includes the information the RLF report received from the UE.

In operation 505, the eNB1 determines a failure reason. A determination method is not the emphasis of the present disclosure, which is not described herein.

In operation 506, the eNB1 transmits the failure reason to the base station triggering the handover, e.g., too early inter-RAT handover, handover to a wrong RAT. The eNB1 transmits a handover report to an MME. The eNB1 may transmits the handover report to the MME through an eNB direct transfer message or other S1 messages. The message includes a LAI to which the cell triggering the handover belongs and an identifier of the RNC to which the cell triggering the handover belongs, may further include a RAC to which the cell triggering the handover belongs or an extended identifier of the RNC to which the cell triggering the handover belongs. The message may further include a cell identifier of the source cell triggering the handover, and/or a cell identifier of the target cell of the last handover before failure, and/or the failure reason e.g., too early inter-RAT handover or handover to an wrong RAT or a cell. During a handover operation, information, such as the LAI of the source cell, the identifier of the RNC, and/or the RAC, and/or the extended identifier of the RNC, and the like, has already been saved.

In operation 507, the MME transmits a handover report to the SGSN. The MME finds the SGSN according to the LAI and/or the RAC in the received message.

In operation 508, the SGSN transmits the received handover report to the RNC. The SGSN finds the RNC according to the identifier of the RNC or the extended identifier of the RNC. The RNC counts problems of MRO according to the failure reason and the cell identifier of the source cell and the target cell of the handover at the last time before the failure occurs.

Thereafter, the whole operation of the method for indicating a failure event to a source access system in accordance with an embodiment of the present disclosure ends.

Figure 6:
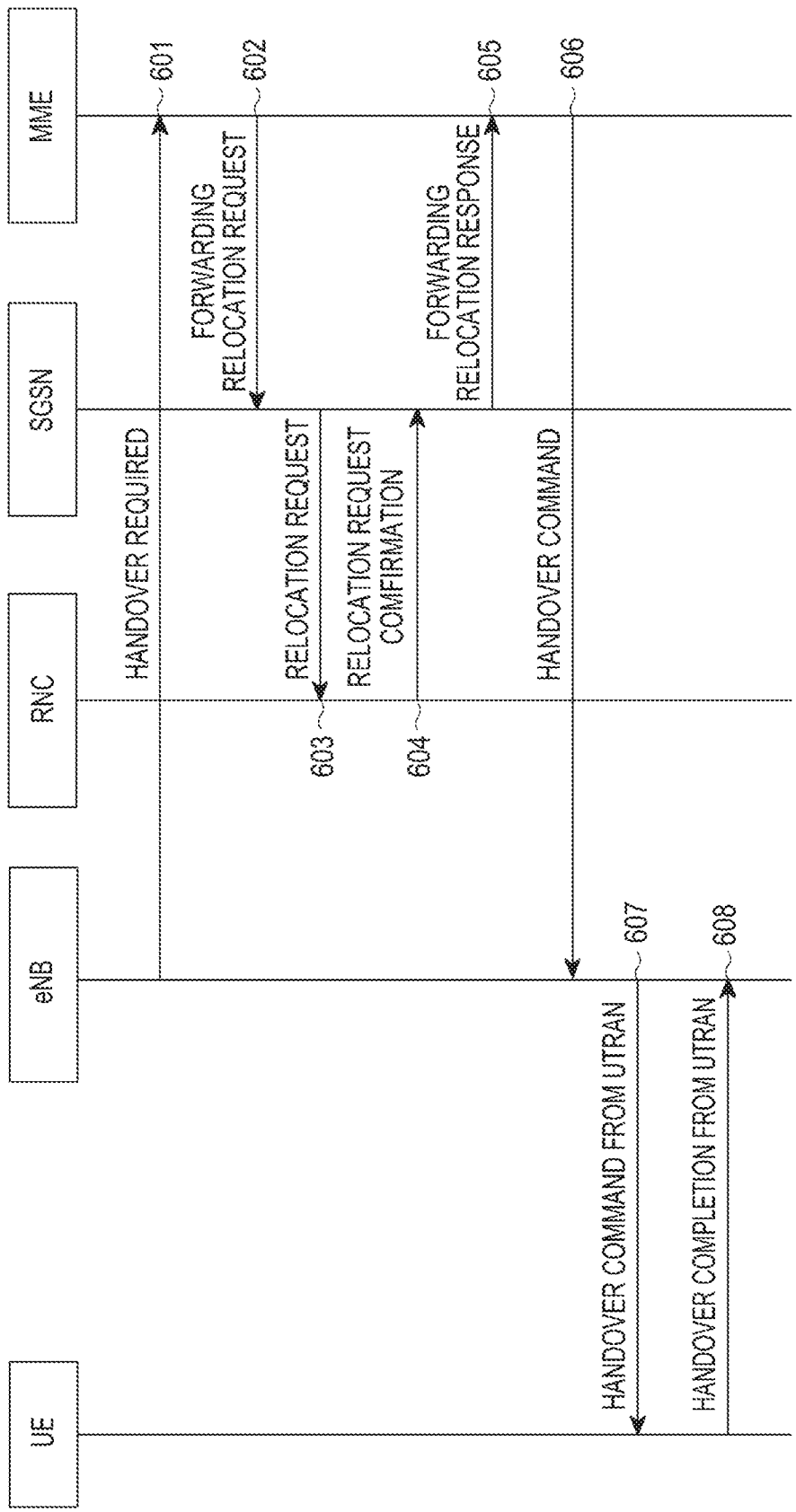
FIG. 6 is a schematic diagram illustrating a method for supporting indication of a failure event to a source access system according to a second embodiment of the present disclosure.

FIG. 6 is a schematic diagram illustrating a method for supporting indication of a failure event to a source access system according to a second embodiment of the present disclosure.

Referring to FIG. 6, the operation includes the process provided below.

In operation 601, an eNB determines handover. The eNB transmits a handover required message to an MME. The message includes information of a source cell. The information of the source cell includes one or more of the following information: an identifier of the source cell, and a TAI to which the source cell belongs.

In operation 602, the MME transmits a forwarding relocation request message to an SGSN. The message includes the information of the source cell. The information of the source is same as in operation 601, which is not described repeatedly herein.

In operation 603, the SGSN transmits a relocation request message to an RNC. The message includes the information of the source cell. The information of the source is same as in operation 601, which is not described repeatedly herein.

In operation 604, the RNC transmits a relocation request confirmation message to the SGSN.

In operation 605, the SGSN transmits a forwarding relocation response message to the MME.

In operation 606, the MME transmits a handover command message to the eNB.

In operation 607, the eNB transmits a handover command message to the UE.

In operation 608, the UE transmits a handover completion from a UTRAN to the RNC.

Thereafter, the whole operation of the method for supporting indication of a failure event to a source access system in accordance with a second embodiment of the present disclosure ends.

Figure 7:
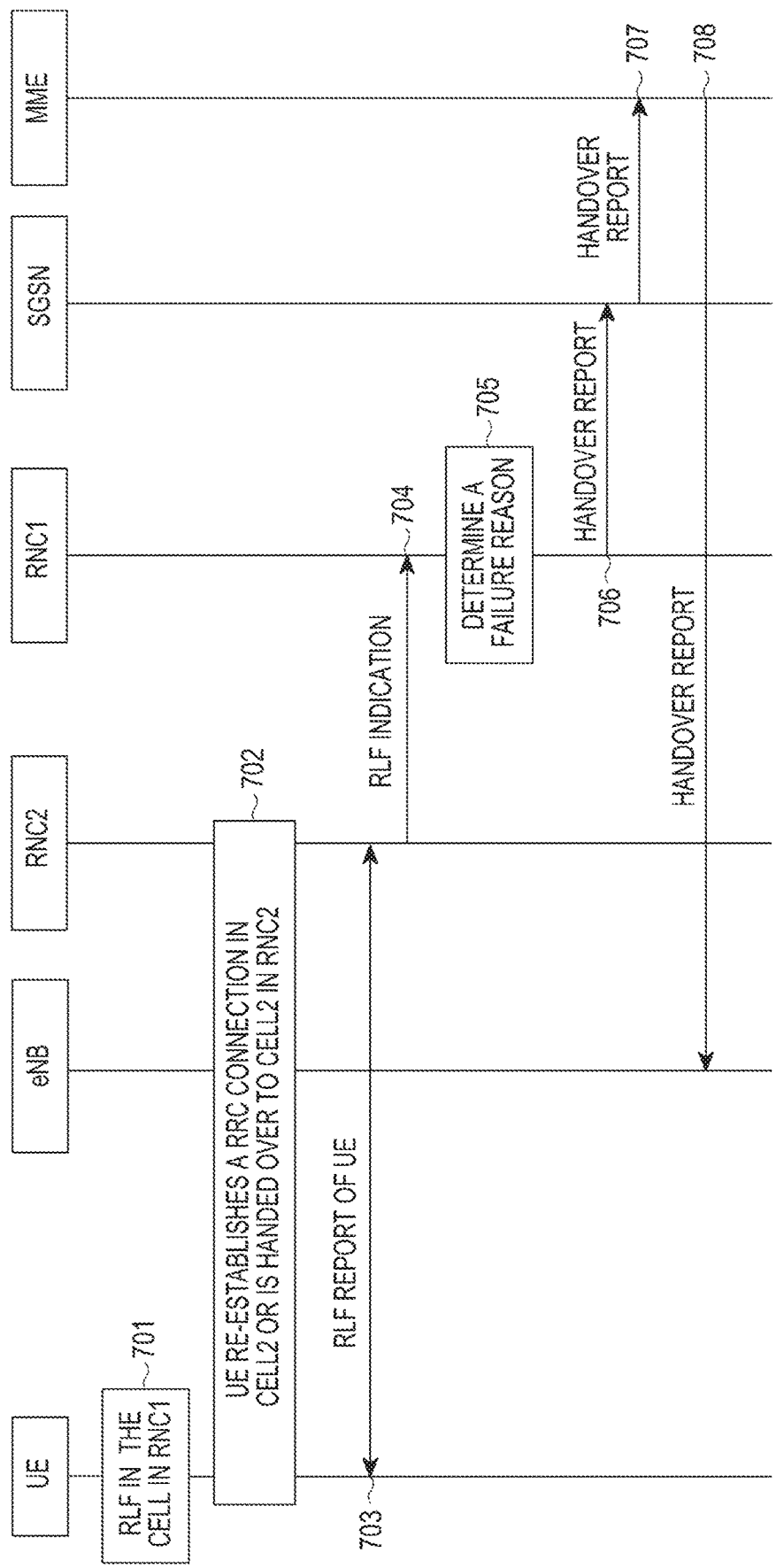
FIG. 7 is a schematic diagram illustrating a method for indicating a failure event to a source access system according to a second embodiment of the present disclosure.

FIG. 7 is a flowchart illustrating a method for indicating a failure event to a source access system according to a second embodiment of the present disclosure.

For example, the embodiment may be used in the follow scenario: in an embodiment in FIG. 6, an eNB just hands over a UE to RNC1 successfully. A RLF occurs for the UE in a cell of the RNC1. When the UE re-accesses a 3G cell, e.g., accessing cell 2 (a cell controlled by RNC2) or is handed over to the cell 2, the UE transmits information of a saved RLF report to the RNC of the cell 2. Herein, after a failure occurs when the UE accesses the cell 1, the UE may access a LTE cell, such as cell 3 first, and then returns to the cell 2 of 3G or is handed over to the cell 2 of 3G.

Referring to FIG. 7, the operation includes the process provided below.

In operation 701, the RLF occurs in the cell of the RNC1 for the UE.

In operation 702, when the UE returns to a cell of 3G, e.g., the UE sets up an RRC connection in the cell 2 controlled by the RNC2 or is handed over to the cell 2 of 3G, the UE indicates to the RNC2 that the UE has information of the RLF report in an RRC connection setup request or an RRC connection setup completion or an RRC connection re-establishment request or an RRC connection re-establishment completion or a handover completion or an RRC connection re-configuration completion or other RRC messages transmitted by the UE.

In operation 703, the RNC2 requests the UE to report the information of the RLF report. The UE transmits the saved RLF report to the RNC2. The RLF report of the UE includes a cell identifier of a cell serving the UE lastly before the failure occurs. Content of the RLF report of the UE is not emphasis of the present disclosure, which is not described herein.

In operation 704, the RNC2 transmits a RLF indication message to the RNC1 serving the UE lastly before the failure occurs. The message may be transmitted to the RNC1 through an Iur interface or an Iu interface through a core network. The RLF report of the UE includes the cell identifier of the cell serving the UE lastly before the failure occurs. The RNC2 transmits the RLF indication message to the RNC to which the cell where the RLF occurs belongs according to the cell identifier. The RLF indication message includes the information of the RLF report of the UE received from the UE.

In operation 705, the RNC1 determines a failure reason. A determination method is not the emphasis of the present disclosure, which is not described herein.

In operation 706, the RNC1 transmits the failure reason to the base station triggering the handover, e.g., too early inter-RAT handover, handover to a wrong RAT. The RNC1 transmits a handover report to a SGSN. The RNC1 may transmit the handover report to the SGSN through a way of a RAN information management (RIM) or other Iu messages. The message includes a TAI to which the cell triggering the handover belongs. The message also includes a cell identifier of the source cell triggering the handover, and/or a cell identifier of the target cell of the last handover, and/or the failure reason e.g., too early inter-RAT handover or handover to an wrong RAT or cell. The identifier of the TAI of the source cell and the cell identifier of the source cell have already been saved during a handover operation.

In operation 707, the SGSN transmits the handover report to the MME. The SGSN finds the MME according to the TAI in the received message.

In operation 708, the MME transmits the received handover report to the eNB. The MME finds the eNB according to the cell identifier of the source cell in the received message. The eNB counts problems of MRO according to the failure reason and the identifier of the source cell and the target cell of the handover at the last time before the failure occurs in the received handover report.

Thereafter, the whole operation of the method for indication of a failure event to a source access system in accordance with a second embodiment of the present disclosure ends.

In embodiments of the present disclosure, in a method for supporting indication of a failure event to a source access system, the source access transmits information of a source cell to a target base station through handover. When a handover problem is detected by a cell of a target base station, the target base station may transmit an event of a handover failure to a base station of the source cell according to the information of the source cell. Thus, correct self-optimization may be performed for a mobile communication system according to a detected reason, to improve performance of the mobile communication system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for executing a handover in a communication system, the method comprising:
   receiving, by a first base station (BS) of a first radio access technology (RAT) which is different from a second RAT, from a second BS of the second RAT, cell information including a cell identifier related to a cell of the second BS;
   detecting, by the first BS, an unnecessary inter-RAT handover from the second RAT to the first RAT; and
   transmitting, by the first BS, to the second BS, a handover report including the cell identifier in response to detection of the unnecessary inter-RAT handover,
   wherein the cell information is used to identify the cell of the second BS in the unnecessary inter-RAT handover.

2. The method of claim 1, wherein the cell identifier is an E-UTRAN cell global identifier (ECGI) of the cell.

3. The method of claim 1, wherein the cell information further includes a tracking area identity (TAI).

4. The method of claim 1, wherein the cell information is received in a handover preparation procedure.

5. The method of claim 1, wherein the cell information is included in a transparent container transmitted from the second BS to the first BS.

6. A first base station (BS) of a first radio access technology (RAT) in a communication system, the first BS comprising:
   a transceiver; and
   at least one processor configured to:

control the transceiver to receive, from a second BS of a second RAT which is different from the first RAT, cell information including a cell identifier related to a cell of the second BS, detect an unnecessary inter-RAT handover from the second RAT to the first RAT, and control the transceiver to transmit, to the second BS, a handover report including the cell identifier in response to detection of the unnecessary inter-RAT handover, wherein the cell information is used to identify the cell of the second BS in the unnecessary inter-RAT handover.

7. The first BS of claim 6, wherein the cell identifier is an E-UTRAN cell global identifier (ECGI) of the cell.

8. The first BS of claim 6, wherein the cell information further includes a tracking area identity (TAI).

9. The first BS of claim 6, wherein the cell information is included in a transparent container transmitted from the second BS to the first BS.

10. The first BS of claim 6, wherein the cell information is received in a handover preparation procedure.

11. A method for executing a handover in a communication system, the method comprising:

transmitting, by a second base station (BS) of a second radio access technology (RAT), to a first BS of a first RAT which is different from the second RAT, cell information including a cell identifier related to a cell of the second BS;

triggering, by the second BS, an inter-RAT handover from the second RAT to the first RAT; and receiving, by the second BS, from the first BS, a handover report including the cell identifier in response to detecting, by the first BS, the inter-RAT handover as an unnecessary inter-RAT handover, wherein the cell information is used to identify the cell of the second BS in the unnecessary inter-RAT handover.

12. The method of claim 11, wherein the cell identifier is an E-UTRAN cell global identifier (ECGI) of the cell.

13. The method of claim 11, wherein the cell information further includes a tracking area identity (TAD).

14. The method of claim 11, wherein the cell information is transmitted in a handover preparation procedure.

15. The method of claim 11, wherein the cell information is included in a transparent container transmitted from the second BS to the first BS.

16. A second base station (BS) of a second radio access technology (RAT) in a communication system, the second BS comprising:

a transceiver; and at least one processor configured to:
control the transceiver to transmit, to a first BS of a first RAT which is different from the second RAT, cell information including a cell identifier related to a cell of the second BS, trigger an inter-RAT handover from the second RAT to the first RAT, and control the transceiver to receive a handover report including the cell identifier in response to detecting, by the first BS, the inter-RAT handover as an unnecessary inter-RAT handover, wherein the cell information is used to identify the cell of the second BS in the unnecessary inter-RAT handover.

17. The second BS of claim 16, wherein the cell identifier is an E-UTRAN cell global identifier (ECGI) of the cell.

18. The second BS of claim 16, wherein the cell information further includes a tracking area identity (TAI).

19. The second BS of claim 16, wherein the cell information is included in a transparent container transmitted from the second BS to the first BS.

20. The second BS of claim 16, wherein the cell information is transmitted in a handover preparation procedure.

* * * * *